Feb. 3, 1970     J. F. ROTH     3,493,325

PROCESS FOR CATALYTICALLY TREATING EXHAUST GASES

Filed Sept. 12, 1967

INVENTOR
JAMES F. ROTH
BY
*Robert J. Schaap*
ATTORNEY

United States Patent Office 3,493,325
Patented Feb. 3, 1970

3,493,325
PROCESS FOR CATALYTICALLY TREATING
EXHAUST GASES
James F. Roth, St. Louis, Mo., assignor to Monsanto
Company, St. Louis, Mo., a corporation of Delaware
Continuation-in-part of application Ser. No. 219,117,
Aug. 24, 1962. This application Sept. 12, 1967, Ser.
No. 664,653
Int. Cl. B01d 53/34, 57/00; B01j 9/04
U.S. Cl. 23—2                                16 Claims

ABSTRACT OF THE DISCLOSURE

The process for catalytic treatment of the exhaust gases in a hydrocarbon combustion engine which involves passing the gases over a degradative resistant catalytic composite comprising an alumina supported metal oxide where less than four percent by weight of the catalytic composite has a diameter size of at least 50 angstroms as detected by X-ray diffraction using nickel filtered copper $K_\alpha$ radiation. The absence of secondary air will cause a reduction of reducible constituents and a presence of secondary air will cause an oxidizing of the oxidizable constituents in the exhaust gas.

---

Figure 1:
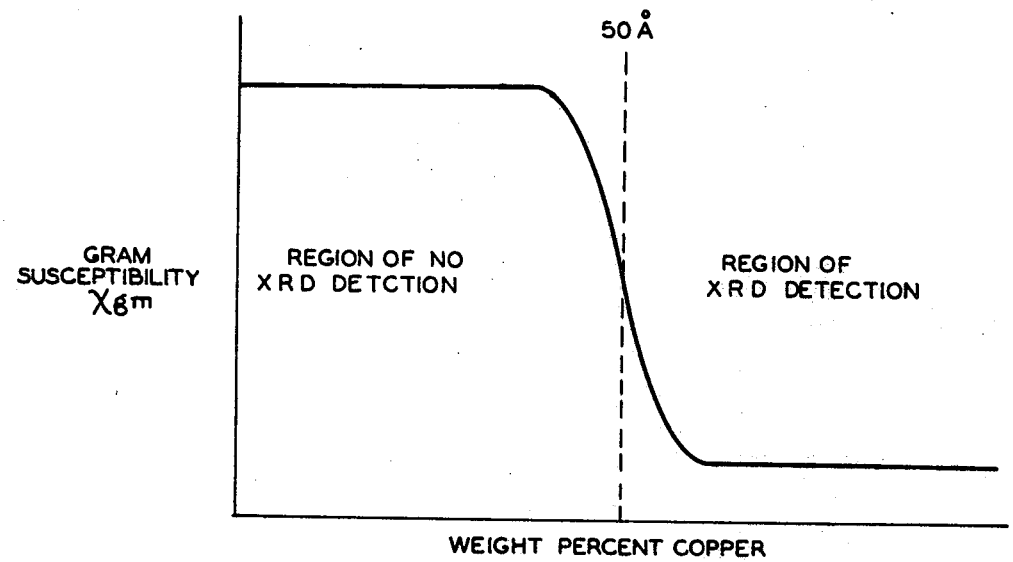

This application is a continuation-in-part of my copending application Ser. No. 219,117, filed Aug. 24, 1962, and now abandoned.

This invention relates to systems for treating exhaust employing catalysts having improved stability and useful life under practical conditions.

Compositions containing Cu, Ni, Co, Fe, Cr, Mn or other metals are well known as oxidation-reduction catalysts. They can promote the oxidation of CO, hydrocarbons, and other oxidizable constituents present in the exhaust from automobile and other hydrocarbon combustion engines.

Their usefulness under practical conditions, however, suffers from inadequate life due to physical breakup, thermal inactivation, lead poisoning, etc.

Thus composites containing active metals or metal compounds on thermally stable supports while reported to promote the oxidation of CO and hydrocarbons in automobile exhaust quite readily and to have good initial activity and reasonable maintenance of activity, show a marked tendency to undergo severe physical disintegration under actual road-test conditions. This degradation is mainly due to side reactions of the catalyst rather than purely mechanical effects and is more prominent with the exhausts of leaded than non-leaded fuels and also when completely oxidizing atmospheres are not maintained continually.

An object of this invention is to provide catalytic compositions that are significantly less susceptible to degradation, when exposed to exhausts of leaded or non-leaded fuels, irrespective of the composition of the exhaust or the addition of secondary air.

Another object is to provide processes for oxidizing the exhausts from hydrocarbon combustion engines comprising employing catalysts having superior resistance to degradation.

A specific object is to provide a means for selecting catalytic compositions having improved stability and useful life for the oxidation of automobile exhaust.

Other objects and advantages are apparent in this disclosure.

The objects of this invention are attained by using catalysts complexed or deposited on suitable supports and having a low crystalline (aggregated) metal and/or metal compound content.

These catalytic compositions can be prepared by well-known techniques, such as impregnation, vaporphase deposition, precipitation, coprecipitation, etc.

As a specific example consider the CuO-alumina system. No matter how prepared this composite can contain CuO in two distinct and different forms which will be referred to as the alpha and beta phases.

The former consists of a thin layer and/or very small crystallites of CuO in which most of the CuO is in intimate contact with the alumina surface.

The latter is crystalline (aggregated) CuO in which most of the CuO is surrounded by other CuO molecules and which resembles bulk CuO. It is largely unaffected by the presence of the alumina phase.

Their chemical and physical properties are very different: CuO, alpha phase, is so highly dispersed that it is not detected by conventional X-ray diffraction techniques whereas the beta phase is readily detected; CuO, alpha phase, has a distinctly higher gram magnetic susceptibility than the beta phase; their rates of reduction are different, etc.

Other catalytic composites whether supported metal, metal oxide, or any other metal compound can likewise be prepared having dispersed and crystalline phases.

The present invention is based in part on the discovery that catalytic compositions with low crystalline content when exposed to the exhaust from hydrocarbon combustion engines have superior resistance to degradation.

The crystalline content of the catalytic composition is conveniently determined by powder X-ray diffraction analysis following standard procedures. Each crystalline component of a mixture produces a characteristic pattern (the intensity of which is proportional to the amount present). By comparison with pure crystalline samples the percent crystalline content for each component can be determined. The total crystalline content is the summation of the crystalline content found for the individual components.

Compositions containing Cu, Ni, Co, Fe, Cr, Mn and other active metals can be used in this invention. Generally these metals are transition metals but any other metal useful as an oxidation-reduction catalyst is suitable.

An active metal can be present in the catalytic compositions as pure metal, metal oxide, any other metal compounds, or any mixture thereof. The metal oxide is, however, generally the more convenient form.

Obviously any combination of suitable catalytic material can be employed comprising mixtures of two or more active metals and/or their compounds.

This invention is applicable regardless of the particular support employed. Best results are obtained with thermally stable supports such as alumina, silica, or similar substances. Also the type or state of the support is non-critical (e.g., both gel and activated alumina are satisfactory).

So long as the catalytic compositions remain suitable for the oxidation of the exhaust from hydrocarbon combustion engines other substances, such as non-catalytic metals and/or their compounds, can be included. Such additives may be inert or serve special functions (e.g., poison resistants).

In practicing this invention preferably the weight percent of crystalline catalyst is less than two percent based on the total catalytic composite, though preparations having less than four percent have improved degradative resistance.

Crystalline catalyst detected by the X-ray diffraction techniques employed is usually at least 50 A. in diameter. The limit of X-ray diffraction analysis detection of crystallites is 50 angstroms. This is particularly true in the case of crystallites of copper oxide dispersed on alumina which undergo major changes in properties as they traverse the size regime in which they are detected by X-ray diffraction analysis. When crystallites have a size smaller than 50 angstroms, the gram magnetic susceptibility materially increases and the particles are not detectable by X-ray diffraction analysis. Hence, the term "crystalline" is properly defined as crystallites which have a size of at least 50 angstroms in diameter. Thus, catalytic material having a diameter of less than 50 angstroms is considered dispersed. The use of the term "crystalline" for crystallites of at least this size is well supported in the literature, reference being made to the Lawrence Spenadel and Michel Boudart article entitled "Dispersion of Platinum on Supported Catalysts" appearing in the Journal of Physical Chemistry, 64.204 (1960). T. A. Doring and R. L. Moss in the article entitled "The Structure and Activity of Supported Metal Catalysts" appearing in the Journal of Catalysis, vol. 7, pages 378–385 (1967) also describes the 50 angstrom limit as the line of demarkation between crystalline and non-crystalline material when detected by X-ray diffraction analysis.

The establishment of the 50 angstroms limit as the limit of crystalline materials, is not an arbitrary or trivial line of demarkation. The fundamental properties of copper oxide and the other catalysts claimed herein materially change at this 50 angstroms limit and this difference accounts for degradation resistance discovered in the present invention. More importantly, there is not a continuum of properties among crystallites of all sizes. In the region of 50 angstroms, a drastic change in gram magnetic susceptibility, a fundamental property of copper oxide, occurs as can be seen by reference to FIGURE 1 of the drawings. It is to be noted that above 50 angstroms, where the gram susceptibility of copper oxide materially changes, X-ray diffraction detection is available. In like manner, with a particle size of less than 50 angstroms, a region of no X-ray diffraction detection is created. This situation is also supported by the literature, reference being made to the P. W. Selwood and Nick S. Dallas article entitled "Susceptibility Isotherms of Supported Copper Oxide" appearing in the Journal of the American Chemical Society, vol. 7, page 2145 (1948).

In order to determine the regime of dispersion of the catalyst of the present invention, X-ray diffraction analyses were performed on a General Electric XRD-5 diffractometer, using nickel filtered copper radiation. In order to determine the catalytic sample quantitatively, a standard sample of copper oxide was determined. The standard sample was pure and approximately 100 percent crystalline. The samples used in the present invention were first scanned qualitatively. A characteristic pattern line of copper oxide was then selected and was free from other phases in the mixture. This line was scanned and its integrated intensity was calculated. The integrated intensity of this line of the sample was then divided by the integrated intensity of the same line in the standard sample which provides a percentage of the substance present in the composition on the basis of relative intensity. By this technique, the analysis of the crystalline copper oxide content is accurate inasmuch as an absorption correction is made for the alumina matrix.

The supported catalyst whether metal or metal compound has a total metal concentration usually ranging from 1 to 15, or as high as 30 percent based on total catalytic composite. The preferred range is 3–15 percent, however other preparations are not excluded.

The present invention has many embodiments and can readily be utilized or modified by those skilled in the art to fill particular needs.

Figure 2:
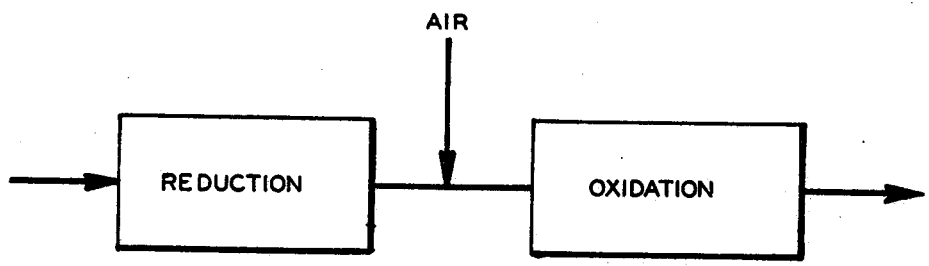

For instance it has been reported that nitrogen oxides may be removed from automobile exhaust by contacting the exhaust with Cu-containing catalysts without addition of secondary air or by a 2-stage process in which Cu-containing catalysts are contacted by exhaust first without air and then with added air [James F. Roth et al., I. & E. C., 53, 293 (1961)]. The present teaching is readily adaptable to provide improved processes employing degradation-resistant catalysts that can promote oxidations or reductions or even provide a practical 2-stage process that removes reducible as well as oxidizable constituents. This type of system is schematically illustrated in FIGURE 2.

Particularly this invention is directed towards treating engine exhaust from automobiles to remove oxidizable constituents such as CO and hydrocarbons.

Broadly, this invention includes all hydrocarbon combustion engines, whether internal combustion or gas turbine, and whether used in automobiles, aircraft, trucks, locomotives, ships, excavating machinery, etc., or affixed at stationary locations.

The hydrocarbon fuels may be gasoline, kerosene, fuel oil, gas, etc., either natural or manufactured.

The following examples illustrate the invention:

EXAMPLE 1

Aging reactor

This procedure provides an excellent method for accelerated testing and produces catalytic degradation similar to that encountered in actual automobile exhaust.

The catalytic compositions are loaded in the fixed bed vertical reactor in 35 cc. samples. Feed compositions are varied automatically with a program timer coupled to a solenoid valve. Two different feed compositions in a nitrogen stream are cycled every 15 minutes. One has about 5.0% CO and 1.25% $O_2$; the other, 5.0% CO and 3.75% $O_2$. In addition all feeds contain about 0.0040% halide. Bromobenzene is commonly used as the source of halide.

The feed is heated to 300° C. before contacting the catalytic material. A typical run takes about 20 hours.

Table 1 shows results obtained from a series of runs using CuO-alumina catalysts prepared by impregnation and having 5–15% Cu by weight.

The percent crystalline CuO content is determined by X-ray diffraction analysis. The integrated intensity of a prominent characteristic peak of CuO is determined both in the catalyst and in pure crystalline CuO under the same conditions.

The ratio of these integrated intensities constitutes the relative intensity. An absorption correction for the alumina is applied to convert the relative intensity to the weight fraction of crystalline CuO actually present in the CuO-alumina composition.

The relative degradation is based on the weight of minus 10 mesh fines produced (unaged catalyst is all plus 10 mesh).

TABLE 1

| Catalyst | Percent crystalline CuO | Relative degradation [1] |
| --- | --- | --- |
| A | 10 | 70 |
| B | 7 | 38 |
| C | 5 | 37 |
| D | 4 | 36 |
| E | 3 | 2 |
| F | 2 | 1 |
| G | 1.5 | 1 |
| H | <0.5 | 1 |
| I | <0.5 | 1 |

[1] The larger the number the more the degradation. Similar results are obtained with catalytic compositions containing Ni, Co, Fe, Cr and Mn oxides. There is superior resistance to degradation when the crystalline content is less than 4% and preferably below 2% based on the total catalytic composite.

EXAMPLE 2

Pilot engine reactor

The catalytic aging is performed with exhaust from a motor generator which is driven by an International Harvester Model UC–60 4 cylinder, 59.5 cubic inch, water cooled gasoline engine, which is moderately loaded by dissipating about 1.5 kw. from the generator through a load resistor. The exhaust passes through a control valve which is set to maintain a pressure of 10″ H₂O in the inlet gas manifold which feeds the reactors. A preheater prevents undue cooling of the exhaust gas and assists the tube furnaces in controlling the inlet gas temperature to the reactors. Air in 25–35% excess is added to the exhaust in a cyclic manner. Tube furnaces heat the inlet gas to 300° C. before contacting the catalytic composition. The flow corresponds to a space velocity of about 10,000 hr.$^{-1}$ through the catalytic bed.

It has been well established that the above procedure produces degradation readily on catalysts that are known to degrade in actual road tests and correlates with their relative susceptibility to degradation. Other temperatures can be used for the catalytic oxidation, for example, the temperature of the inlet gas may range from about 100° C. to about 400° C.

CuO alumina composites tested in the accelerated aging reactor are run under standard conditions for a total exposure of 105 hours. Results again represent the relative weight of fines produced by aging.

TABLE 2

| Catalyst | Percent crystalline CuO | Relative degradation [1] |
|---|---|---|
| D | 4 | 41 |
| E | 3 | 2 |
| F | 2 | 1 |
| I | <0.5 | [2] 1 |

[1] The larger the number the more the degradation.
[2] This value represents the relative degradation after 250 hours in the pilot engine reactor.

EXAMPLE 3

Catalyst preparation

The catalysts employed in the practice of this invention may be prepared by any method.

As an example the Cu catalysts are prepared by impregnation of different alumina supports (including activated and amorphous gel aluminas) with both similar and varying concentrations of Cu(NO₃)₂·3H₂O in water. The impregnated supports were dried at 120° C. for periods ranging from 2 to 12 hours and were then calcined at 500° C. for 4 to 12 hours.

Cu catalysts are also prepared by coprecipitation of copper and alumina from aqueous solution.

The weight percent Cu contents varied from 5 to 15% in the catalysts used in the preceding examples.

In some cases catalysts with the same weight percent Cu content show tremendous differences in their relative degradation. Thus catalysts B and H have about the same Cu content (7.80 and 7.84 weight percent respectively) while the latter is more resistant to degradation by a factor of 38. This demonstrates that the critical factor is not the total Cu content but rather the weight percent crystalline CuO present.

Catalysts H (already discussed) and I have the lowest crystalline CuO content among the preparations tested and, as indicated by the preceding examples, these catalysts show superior degradative resistance.

Catalyst I is prepared by adding 2 kg. of activated alumina to 2.5 l. of Cu(NO₃)₂·3H₂O solution containing 0.100 g. of Cu per ml. The mixture is allowed to stand at least 1 hour with occasional stirring and then filtered. The impregnated balls are rapidly rinsed with water for 5 sec., dried at 120° C. for 6 hours, and calcined at 500° C. for 12 hours. The final catalyst contains 5.33% Cu by weight and has <0.5% crystalline CuO.

The alumina which is used has an appreciable selective adsorption [1] for Cu ions from the impregnating solution and also has a small macropore volume, both

[1] From the pore volume of the alumina and the Cu solution concentration the "nominal" Cu content is calculated. The "actual" Cu content is larger than the nominal content due to the "selective adsorption" of the alumina. For example when 100 g. of alumina is immersed for 1 hour in 154 ml. of Cu(NO₃)₂·3H₂O solution of such concentration as to yield a nominal Cu content of 4.0% by weight of final calcined catalyst, the actual Cu content is >5.0%.

properties contributing to low crystalline content of the CuO in the final catalyst. The macropore volume (pores >350 A. as determined by the mercury porosimeter method) is preferably <0.20 cc. per g. of alumina.

Catalytic compositions with Ni, Co, Fe, Cr and Mn oxides are prepared by standard procedures similar to those used in preparing the Cu composites.

After preparation X-ray diffraction techniques are used to select the catalytic compositions with low crystalline content. Thus the present invention is only incidentally concerned with catalytic preparation. What is primarily disclosed is the means for selecting degradation-resistant catalysts whether prepared by present standard practices or methods that will subsequently be developed.

Having thus described my invention, what I desire to claim and secure by Letters Patent is:

1. A process for the catalytic oxidation of oxidizable constituents present in the exhaust from a hydrocarbon combustion engine which comprises passing said exhaust over a degradation-resistant exhaust-oxidizing catalytic composite of a supported metal oxide selected from the class consisting of copper oxide, nickel oxide, cobalt oxide, iron oxide, chromium oxide, and manganese oxide in the presence of air and in which the metal oxide is dispersed to the extent that less than 4% by weight of metal oxide based on the total catalytic composite, has a diameter size of at least 50 A. as detected by X-ray diffraction using nickel filtered copper $K_\alpha$ radiation.

2. A process in accordance with claim 1 in which the oxidizable constituents are CO and hydrocarbons.

3. A process in accordance with claim 1 in which the hydrocarbon combustion engine is an internal combustion automobile engine.

4. A process for the catalytic oxidation of oxidizable constituents present in the exhaust from a hydrocarbon combustion engine which comprises passing said exhaust in the presence of secondary air over a degradative-resistant exhaust-oxidizing catalytic composite of alumina supported copper oxide and in which the copper oxide is dispersed to the extent that less than 4% by weight based on the total catalytic composite, has a diameter size of at least 50 A. as detected by X-ray diffraction using nickel filtered copper $K_\alpha$ radiation.

5. A process in accordance with claim 4 in which no more than a small fraction of the CuO, less than 2% by weight based on the total catalytic composite has a diameter size of at least 50 A. as detected by X-ray diffraction using nickel filtered copper $K_\alpha$ radiation.

6. A process in accordance with claim 4 in which the oxidizable constituents are CO and hydrocarbons.

7. A process in accordance with claim 4 in which the hydrocarbon combustion engine is an internal combustion automobile engine.

8. A process for the catalytic oxidation of oxidizable constituents present in the exhaust from a hydrocarbon combustion engine which comprises passing said exhaust over a degradative-resistant exhaust-oxidizing catalytic composite of an alumina-supported metal oxide selected from the class consisting of copper oxide, nickel oxide, cobalt oxide, iron oxide, chromium oxide, and manganese oxide in the presence of air and in which the metal oxide is dispersed to the extent that less than 4% by weight based on the total catalytic composite, has a diameter size of at least 50 A. as detected by X-ray diffraction using nickel filtered copper $K_\alpha$ radiation.

9. A process in accordance with claim 8 in which the oxidizable constituents are CO and hydrocarbons.

10. A process for the treating of oxidizable and reducible constituents present in the exhaust from a hydrocarbon combustion engine which comprises passing said exhaust over a degradative-resistant catalytic composite which is capable of oxidizing the oxidizable constituents in the presence of air and of reducing the reducible constituents in the absence of air, said catalytic composite comprising an alumina supported metal oxide selected from the class consisting of copper oxide, nickel oxide, cobalt oxide, iron oxide, chromium oxide, and manganese oxide, in which the metal oxide is dispersed to the extent that less than 4% by weight based on the total catalytic composite, has a diameter size of at least 50 A. as detected by X-ray diffraction using nickel filtered copper $K_\alpha$ radiation.

11. A process in accordance with claim 10 in which the oxidizable constituents are carbon monoxide and hydrocarbons and the reducible constituents are nitrogen oxides.

12. A process for the catalytic reduction of reducible constituents present in the exhaust from a hydrocarbon combustion engine which comprises passing said exhaust in the absence of secondary air over a degradative-resistant exhaust-reducing catalytic composite of an alumina supported metal oxide selected from the class consisting of copper oxide, nickel oxide, cobalt oxide, iron oxide, chromium oxide, and manganese oxide, in which the metal oxide is dispersed to the extent that less than 4% by weight based on the total catalytic composite, has a diameter size of at least 50 A. as detected by X-ray diffraction using nickel filtered copper $K_\alpha$ radiation.

13. A process in accordance with claim 12 in which the reducible constituents are nitrogen oxides.

14. A multi-stage process for the catalytic treating of oxidizable and reducible constituents present in the exhaust from a hydrocarbon combustion engine which comprises passing said exhaust in a first stage in the absence of secondary air over a degradative-resistant catalytic composite which is capable of reducing the reducible constituents and then passing said exhaust in the presence of secondary air over a degradative-resistant catalytic composite for oxidizing the oxidizable constituents, each of said catalytic composites comprising a supported metal oxide selected from the class consisting of copper oxide, nickel oxide, cobalt oxide, iron oxide, chromium oxide, and manganese oxide in which the metal oxide is dispersed to the extent that less than 4% by weight based on the total catalytic composite has a diameter size of at least 50 A. as detected by X-ray diffraction using nickel filtered copper $K_\alpha$ radiation.

15. A process in accordance with claim 14 in which the oxidizable constituents are carbon monoxide and hydrocarbons, and the reducible constituents are nitrogen oxides.

16. A multi-stage process for the catalytic treating of oxidizable and reducible constituents present in the exhaust from a hydrocarbon combustion engine which comprises passing said exhaust in a first stage in the absence of secondary air over a degradative-resistant catalytic composite which is capable of reducing the reducible constituents, and then passing said exhaust in the presence of secondary air over a degradative-resistant catalytic composite for oxidizing the oxidizable constituents, each of said catalytic composites comprising an alumina supported metal oxide selected from the class consisting of copper oxide, nickel oxide, cobalt oxide, iron oxide, chromium oxide, and manganese oxide in which the metal oxide is dispersed to the extent that less than 4% by weight based on the total catalytic composite has a diameter size of at least 50 A. as detected by X-ray diffraction using nickel filtered copper $K_\alpha$ radiation.

References Cited

UNITED STATES PATENTS

| | | | |
|---|---|---|---|
| 1,345,323 | 6/1920 | Frazer et al. | 23—2 |
| 1,902,160 | 3/1933 | Frazer et al. | 23—2 |
| 2,937,490 | 6/1963 | Calvert | 23—2 X |
| 3,133,029 | 5/1964 | Hoekstra | 23—2 X |
| 3,206,414 | 9/1965 | Gunther | 23—2 X |
| 3,418,070 | 12/1968 | Roth | 23—2 |

FOREIGN PATENTS

| | | |
|---|---|---|
| 411,655 | 6/1934 | Great Britain. |
| 436,906 | 10/1935 | Great Britain. |

OSCAR R. VERTIZ, Primary Examiner

E. C. THOMAS, Assistant Examiner

U.S. Cl. X.R.

252—463, 465, 466, 467, 471, 472, 476